(12) United States Patent
Snyder (10) Patent No.: US 10,181,249 B2
(45) Date of Patent: Jan. 15, 2019

(54) SYSTEMS, METHODS AND COMPUTER PROGRAM PRODUCTS FOR DETECTING A PRESENCE OF AN OBJECT IN A BODY OF WATER

(71) Applicant: Seal Innovation, Inc., Raleigh, NC (US)

(72) Inventor: Graham E. Snyder, Raleigh, NC (US)

( * ) Notice: Subject to any disclaimer, the term of this patent is extended or adjusted under 35 U.S.C. 154(b) by 0 days.

(21) Appl. No.: 15/697,800

(22) Filed: Sep. 7, 2017

(65) Prior Publication Data

US 2018/0089980 A1  Mar. 29, 2018

Related U.S. Application Data

(60) Provisional application No. 62/384,518, filed on Sep. 7, 2016.

(51) Int. Cl.
| | |
|---|---|
| *G06K 9/00* | (2006.01) |
| *G08B 21/08* | (2006.01) |
| *G06T 7/246* | (2017.01) |
| *G06T 7/73* | (2017.01) |
| *G06K 9/46* | (2006.01) |
| *G08B 3/10* | (2006.01) |
| *G08B 5/36* | (2006.01) |
| *G08B 13/193* | (2006.01) |
| *G08B 13/196* | (2006.01) |

(52) U.S. Cl.
CPC ....... *G08B 21/086* (2013.01); *G06K 9/00369* (2013.01); *G06K 9/00771* (2013.01); *G06K 9/46* (2013.01); *G06T 7/246* (2017.01); *G06T 7/73* (2017.01); *G08B 3/10* (2013.01); *G08B 5/36* (2013.01); *G08B 13/193* (2013.01); *G08B 13/1961* (2013.01); *G06T 2207/10048* (2013.01); *G06T 2207/30196* (2013.01); *G06T 2207/30232* (2013.01)

(58) Field of Classification Search
CPC .. G06K 9/00369; G06K 9/00771; G06K 9/46; G06T 2207/10048; G06T 2207/30196; G06T 2207/30232; G06T 7/246; G06T 7/73; G08B 13/193; G08B 13/1961; G08B 21/086; G08B 3/10; G08B 5/36
See application file for complete search history.

(56) References Cited

U.S. PATENT DOCUMENTS

| 5,886,630 | A | * | 3/1999 | Menoud | G08B 21/082 340/540 |
|---|---|---|---|---|---|
| 6,133,838 | A | * | 10/2000 | Meniere | G08B 21/082 340/566 |
| 7,123,746 | B2 | * | 10/2006 | Meniere | G01V 8/10 382/103 |

(Continued)

*Primary Examiner* — Tom Y Lu
(74) *Attorney, Agent, or Firm* — Myers Bigel, P.A.

(57) ABSTRACT

A method for detecting a presence of an object in an image comprising a pool region includes receiving an infrared image from an image sensor; identifying an area of substantially homogeneous temperature and having an outer perimeter; defining the pool region in the infrared image in response to the identified area of substantially homogeneous temperature and having an outer perimeter; identifying an object in the infrared image; and triggering an alarm in response to a predefined change in position of the object with respect to the pool region.

22 Claims, 9 Drawing Sheets

(56) References Cited

U.S. PATENT DOCUMENTS 7,839,291 B1 * 11/2010 Richards .............. G08B 21/086
                                                           340/553
9,727,979 B1 * 8/2017 Bella ......................... G06T 7/70

* cited by examiner

SYSTEMS, METHODS AND COMPUTER PROGRAM PRODUCTS FOR DETECTING A PRESENCE OF AN OBJECT IN A BODY OF WATER

RELATED APPLICATIONS

This application claims priority to U.S. Provisional Application No. 62/384,518, filed Sep. 7, 2016, the disclosure of which is hereby incorporated by reference in its entirety.

FIELD OF THE INVENTION

The present invention relates to water safety monitoring devices for detecting a person entering a body of water.

BACKGROUND

Drowning remains a significant cause of accidental deaths, especially among children. Many children are non-swimmers and die as a result of falling into pools or off of boats; however, many children and adults who are swimmers die either from panic, exhaustion, cramps, seizures or a combination thereof Children may drown despite being supervised while swimming. The parents or other adults supervising the child may have "just looked away for a second" only to find the child drowned on the bottom of the pool.

Several attempts have been made to address water safety with various degrees of success. For the non-swimmer, such as a toddler, the Safety Turtle™ device (Terrapin Communications Inc., Ottawa, Canada) is a bracelet, which when submerged triggers a pool-side alarm to activate and to notify that a person has fallen into the water. Although the Safety Turtle™ device is excellent at detecting a person falling into the water, it may not be suitable for a child who is allowed to play in the water because the Safety Turtle™ device will generally activate in the course of normal play whenever the child's arm is submerged and produce false alarms.

Monitoring systems that use wearable alarm devices can provide significant enhancements over pool alarms. For example, wearable swim monitors and drowning detection systems may track the swimmer in the water and identify possible drowning events. However, these systems may be limited in the sense that the swimmer or supervisor must proactively attach the wearable alarm device to the swimmer's body; if the device is not attached, the swimmer will not be protected.

Infrared cameras have been used as motion detectors such that if the infrared signal changes quickly, for example, when a person enters the field of view, an alarm or other motion-related event (e.g., turning on lights) is triggered. However, it may be difficult to determine with a traditional motion sensing infrared camera when the motion is around the pool or due to someone falling into the pool because traditionally analyzed motion detectors typically have difficulty distinguishing between a moving figure and a figure who has fallen into a pool. Infrared detectors have also been used to detect an emitted infrared signal around a perimeter of the pool; however, these systems are difficult to maintain since any misalignment may result in the infrared signal being directed away from the detector. Existing pool sensors may require complex algorithms and calibration steps to define the pool area for monitoring.

SUMMARY

According to some embodiments of the present invention, a method for detecting a presence of an object in an image comprising a pool region includes receiving an infrared image from an image sensor; identifying an area of substantially homogeneous temperature and having an outer perimeter; defining the pool region in the infrared image in response to the identified area of substantially homogeneous temperature and having an outer perimeter; identifying an object in the infrared image; and triggering an alarm in response to a predefined change in position of the object with respect to the pool region.

In some embodiments, identifying an object comprises detecting a person in the infrared image based on a temperature gradient of the object of at least four degrees Fahrenheit within the object.

In some embodiments, the predefined change in position of the object comprises detecting if the object extends into the pool region in the infrared image.

In some embodiments, the predefined change in position of the object comprises detecting the object in the pool region in a first infrared image and then detecting an absence of or signal reduction associated with the the object in a second, subsequent infrared image for longer than a predefined amount of time. First and second visual images corresponding in time to the first and second infrared images, respectively, may be received from another image sensor; and the alarm may be triggered if the second visual image indicates that the object is in the pool region and the second infrared image indicates an absence of or signal reduction associated with the object for longer than a predefined amount of time. In some embodiments, images of at least first and second users may be received, and the predefined amount of time comprises a first predefined amount of time associated with the first user and a second predefined amount of time associated with the second user. The image of the first or second user may be identified in the image, and the object comprises the identified first or second user. The first or second predefined amount of time may be based on the identified first or second user.

In some embodiments, a notice is triggered if the image sensor can no longer sense the outer perimeter of the pool region for longer than a predefined amount of time.

In some embodiments, an alarm is triggered if the infrared image ceases to be received from the image sensor.

In some embodiments, the infrared image is a series of infrared images, and if a moving object is detected within a predefined region in or adjacent the pool region and then is absent from a subsequent infrared image in the series of infrared images for a predefined time, an alarm is triggered.

In some embodiments, triggering an alarm comprises providing a pre-warning alarm before a full alarm is triggered, and accepting an abort command from a user during the pre-warning alarm that aborts the full alarm.

In some embodiments, when the alarm is triggered, a visual or audible alarm is emitted from an alarm unit.

According to further embodiments of the present invention, a system for detecting a presence of an object in an image comprising a pool region includes one or more image sensors that are configured to generate infrared images; an image analyzer configured to identify an area of substantially homogeneous temperature and having an outer perimeter, to define the pool region in the infrared images in response to the identified area of substantially homogeneous temperature and having an outer perimeter, to identify an object in the infrared image, and to trigger an alarm in response to a predefined change in position of the object with respect to the pool region.

In some embodiments, the image analyzer is configured to identify the object by detecting a person in the infrared image based on a temperature gradient of the object of at least four degrees Fahrenheit in the object.

In some embodiments, the predefined change in position of the object comprises detecting, by the image analyzer, if the object extends into the pool region in the infrared image.

In some embodiments, the predefined change in position of the object comprises detecting, by the image analyzer, the object in the pool region in a first infrared image and then detecting, by the image analyzer, an absence of or reduction of the signal associated with the object in a second, subsequent infrared image for longer than a predefined amount of time. In some embodiments, the image analyzer is configured to receive first and second visual images corresponding in time to the first and second infrared images, respectively, from another image sensor; and to trigger the alarm if the second visual image indicates that the object is in the pool region and the second infrared image indicates an absence of or reduction of the signal associated with the object for longer than a predefined amount of time. In some embodiments, the image analyzer is configured to receive images of at least first and second users, wherein the predefined amount of time comprises a first predefined amount of time associated with the first user and a second predefined amount of time associated with the second user, the image analyzer is further configured to identify an image of the first or second user, wherein the object comprises the identified first or second user; and to select the first or second predefined amount of time based on the identified first or second user.

In some embodiment, the image analyzer is configured to trigger a notice if the image sensor can no longer sense the outer perimeter of the pool region for longer than a predefined amount of time.

In some embodiments, the image analyzer is configured to trigger an alarm if the infrared image ceases to be received from the image sensor.

In some embodiments, the infrared image is a series of infrared images, and the image analyzer is configured to trigger an alarm if a moving object greater than a predefined size is detected within a predetermined region in or adjacent the pool region and then is absent from a subsequent infrared image in the series of infrared images.

In some embodiments, the image analyzer is configured to trigger an alarm that provides a pre-warning alarm before a full alarm is triggered, and the image analyzer is configured to accept an abort command from a user during the pre-warning alarm that aborts the full alarm.

In some embodiments, an alarm unit is configured to receive the trigger for an alarm from the signal analyzer such that when the alarm is triggered, a visual or audible alarm is emitted from an alarm unit.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

Exemplary embodiments are described below with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer-usable or computer-readable medium may be, for example but not limited to, an electronic, magnetic, optical, electromagnetic, or semiconductor data storage system, apparatus, or device. More specific examples (a non-exhaustive list) of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

As used herein, the term "infrared" refers to spectra useful for thermal imaging, including near infrared (NIR, IR-A) between about 0.75 and 1.4 µm in wavelength; short wavelength infrared (SWIR, IR-B) between about 1.4 and 3 µm; mid wavelength infrared (MWIR, IR-C); intermediate infrared (IIR), between about 3 and 8 µm; long wavelength infrared (LWIR, IR-C) between about 8 and 15 µm; and far infrared (FIR) between about 5 and 1,000 µm.

Figure 1:
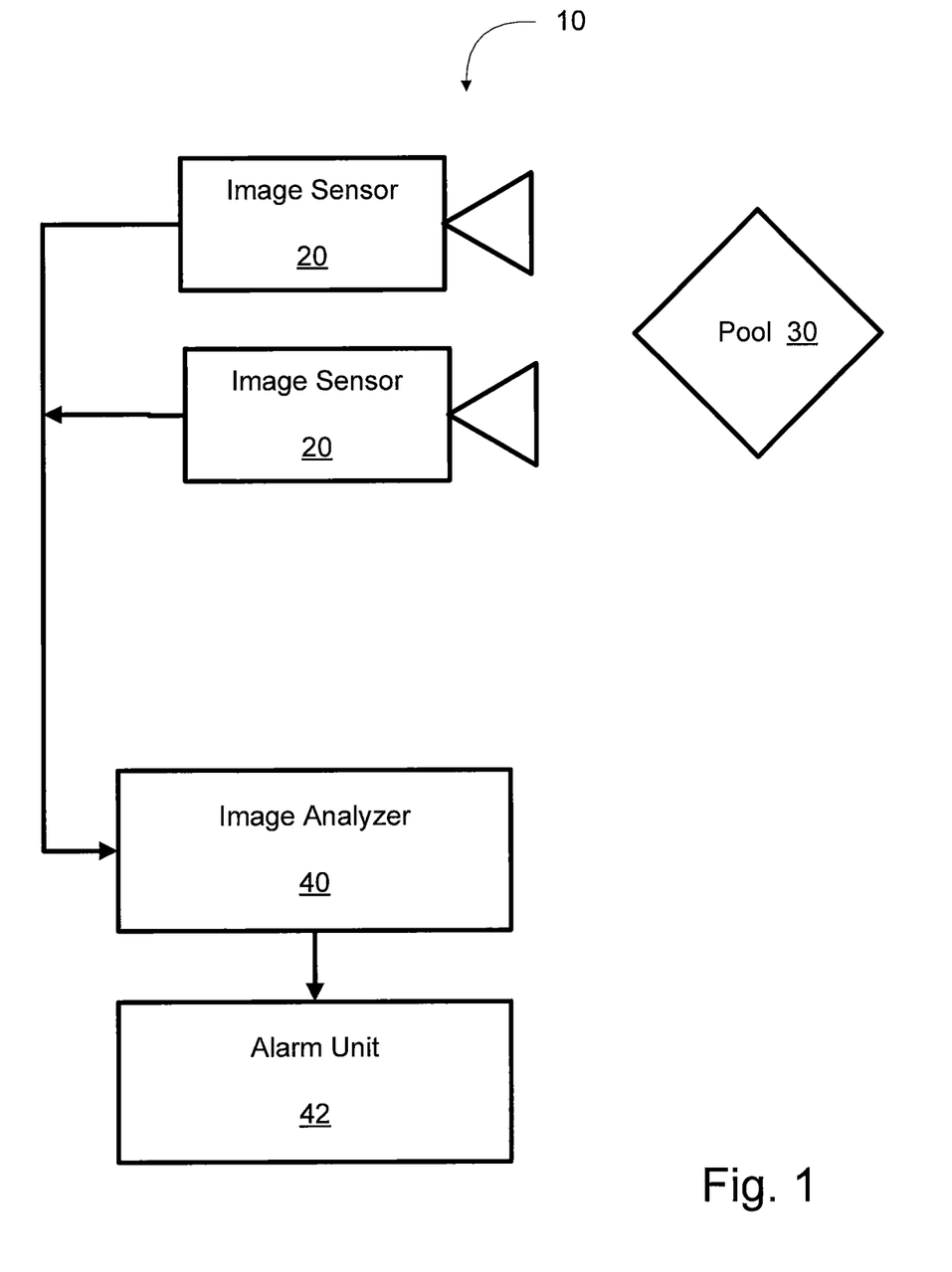
FIG. 1 is a schematic drawing illustrating a monitoring system according to some embodiments of the present invention.

As illustrated in FIG. 1, an imaging system 10 includes one or more image sensors 20 and an image analyzer 40. The image sensors 20 are positioned to take an image of a pool 30. The image analyzer 40 may include a processor configured to analyze images of the pool 30 and its surrounding area, and an alarm unit 42. The alarm unit 42 may include visual and/or audible alarms and an optional user interface for receiving input from a user and outputting information to the user. It should be understood that the functions of the image analyzer 40, image sensor 20, and alarm unit 42 described herein may be performed by any suitable processing device, and the image analyzer 40, image sensor 20, and alarm unit 42 may be provided in the same or different devices. The image sensor 20 may be an infrared camera, CCD camera, CMOS camera, digital camera, stereoscopic camera and/or video camera. In some embodiments, the image sensor collects data in a continuous video feed or in a series of images that may be separated in time.

Figure 2:
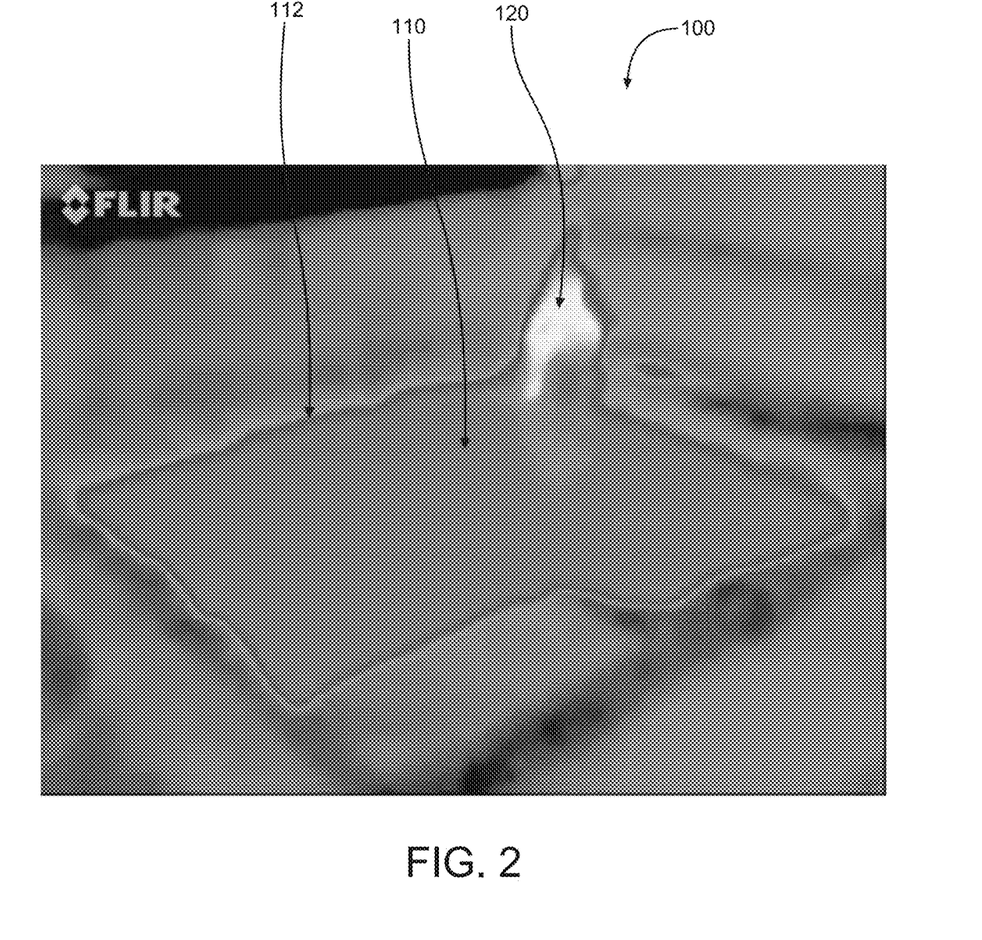
FIG. 2 is a digital image of a pool on according to some embodiments of the present invention.

A thermal image 100 of a pool from an infrared camera (e.g., image sensor 40) is shown in FIG. 2. As shown in FIG. 2, the image 100 includes a pool region 110 and an object 120, such as a person entering the pool region 110. The image analyzer 40 is configured to analyze the image 100 by detecting a homogeneous temperature region (or largest homogeneous temperature region). The image analyzer 40 defines the pool region 110 by identifying a region having a substantially homogeneous temperature and an outer perimeter 112 or boundary of the homogeneous temperature. A pool of water has a temperature that is generally homogeneous across the water, and any temperature gradient may have a characteristic, smooth gradient. In contrast, other objects typically found near a pool may have a much less homogeneous temperature. For example, concrete pavement may have significant temperature changes that can be distinguished from a body of water in an infrared image. The infrared image generated by a person in the field of view may also have a temperature gradient within the boundaries formed by the person, for example, of about four degrees Fahrenheit or more. In some embodiments, the image analyzer 40 may be programmed to analyze temperature or image variations to compare a detected object to a database of known human and non-human shapes, including pool pump jet streams, sun reflections, moon reflections, linear edged objects, spheres, dogs, cats and the like. Such recognized non-human shapes may be disregarded in analyzing the image 100 to identify the pool region 110 and/or to sound an alarm when a recognized non-human shape enters the pool region.

According to some embodiments, the characteristic uniform temperature of the water may be used to identify the pool region 110 based on the images from the image sensor 20 with minimal set up steps or calibration by the user. Thus, the image sensor 20 may take images to capture a video or serial still images at a given frequency (e.g., several times a second) to detect when a moving object has crossed the outer perimeter 112 into the pool region 110. In some embodiments, the image analyzer 40 may automatically recalibrate to identify the pool region 110 as a region of the largest continuous or substantially continuous region in the image 100. Accordingly, if the image sensor 20 is moved, the outer perimeter 112 and pool region 110 may still be identified without requiring intervention from a user.

If during calibration, the water area extends beyond the field of view of the image sensor 20, then the sensor 20 is likely pointed incorrectly such that some parts of the pool are not covered by the sensor 20. The image analyzer 40 can then return a fault signal to the user to reorient the sensor 20.

Figure 3:
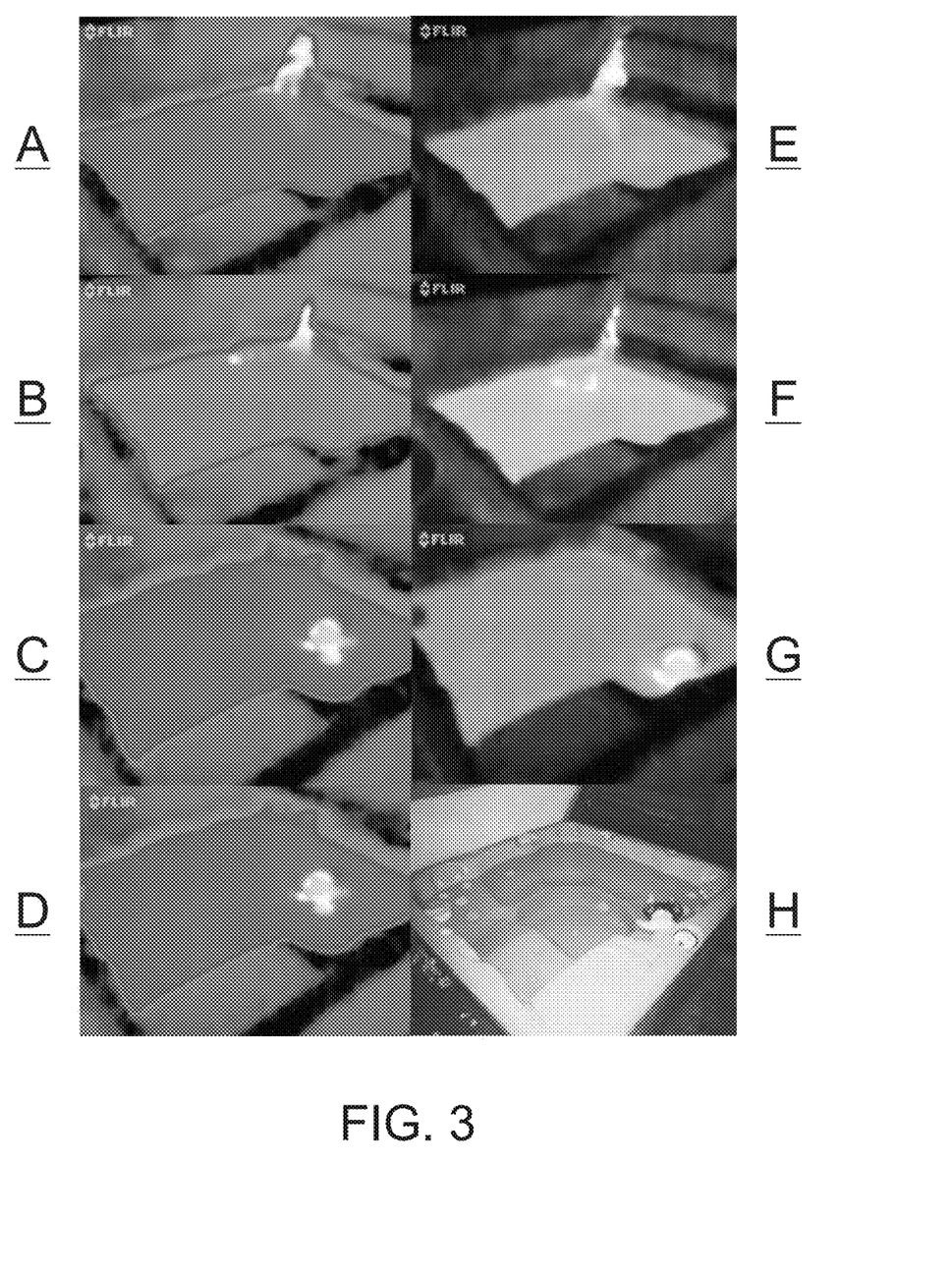
FIG. 3 is a series of digital images A-H according to some embodiments of the present invention.

Once the pool region 110 and outer perimeter 112 (or "keep out" boundary) are defined, then a variety of triggers or alarms may be defined by an interaction between an object (e.g., as detected as a thermal perturbation) in the image 100 and the pool region 110/outer perimeter 112. For example, FIG. 3 illustrates images of a person who is partially in the pool (Images A, B, E, and F) and entirely in the pool (Images C, D, G and H). An alarm or trigger may be selected by the image analyzer 40 or other processor based on a position of the object with respect to the pool region 110/outer perimeter 112 or a degree to which the object overlaps with the pool region 110.

Figure 4:
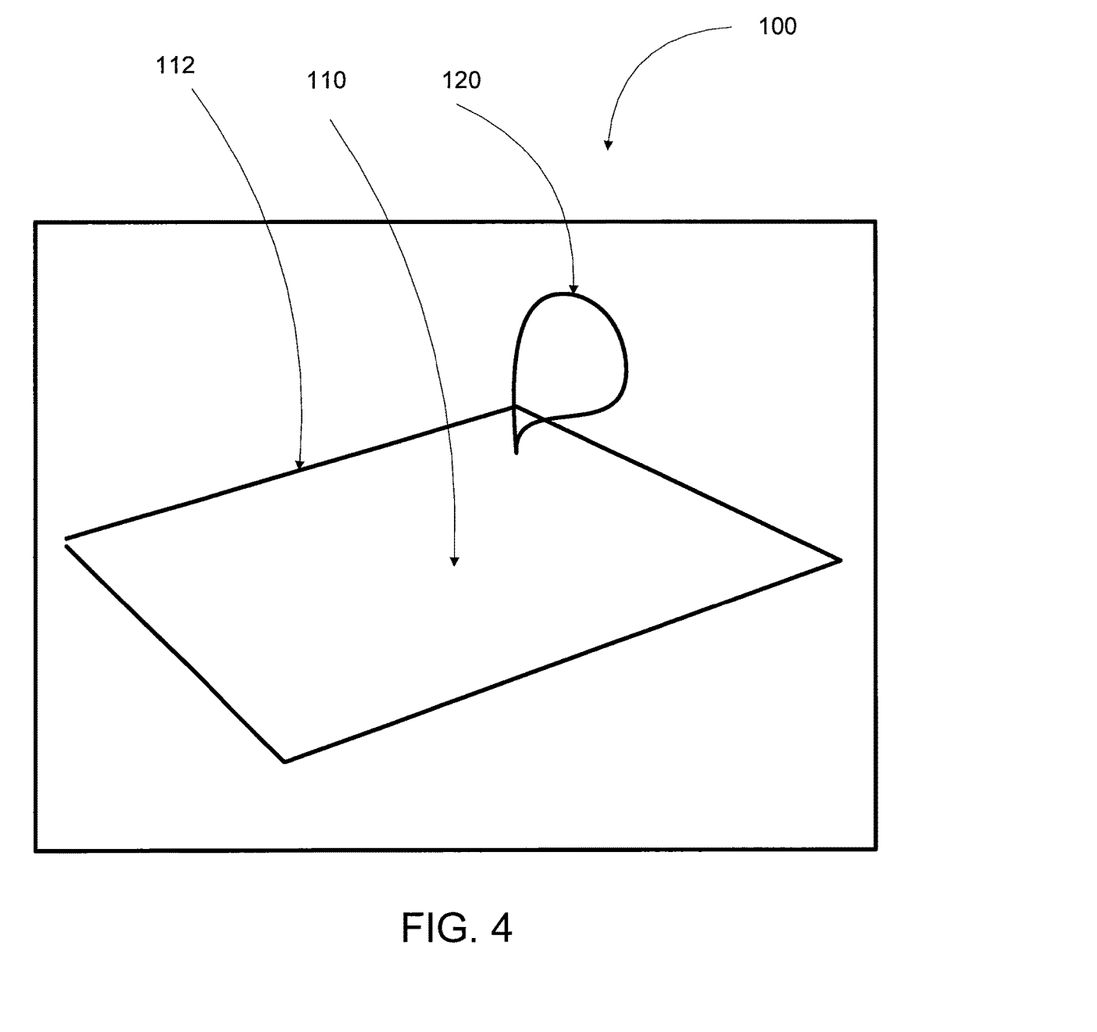
FIGS. 4-8 are schematic illustrations of a pool image according to some embodiments of the present invention.
Figure 5:
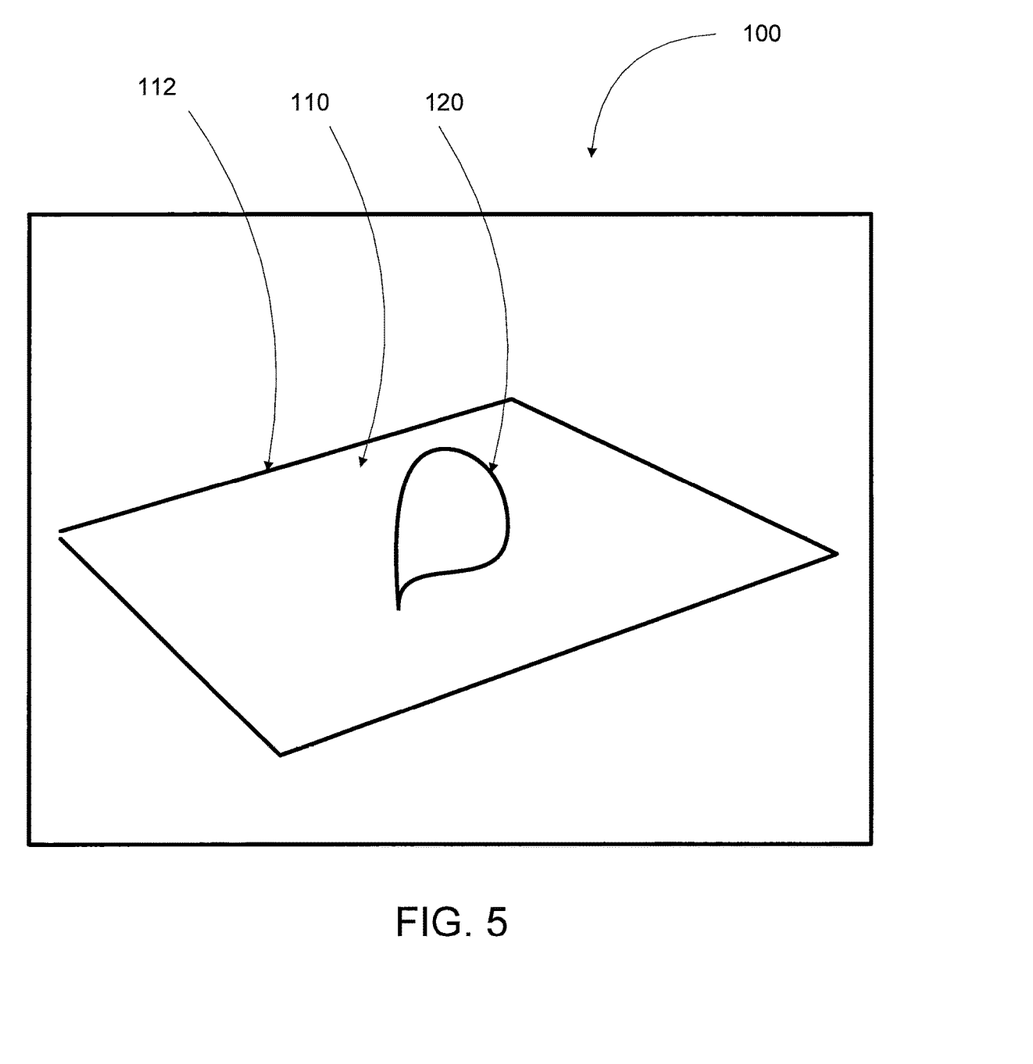
Figure 6:
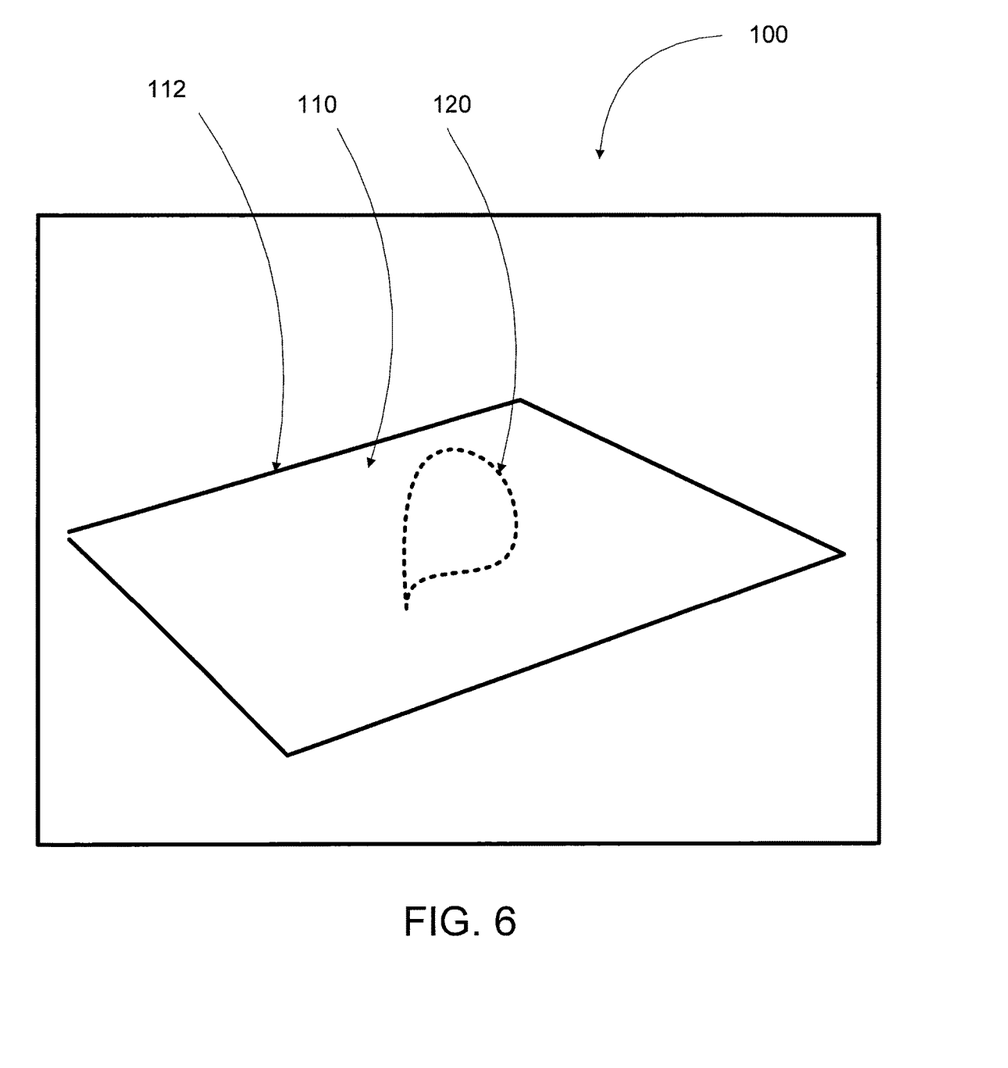

FIG. 4 illustrates an object 120 that extends only partially past the perimeter 112 into the pool region 110. In this case, a low level alarm or alert may be triggered, such as a blinking light or text message sent to the user or homeowner. FIG. 5 illustrates that the object 120 has now entirely entered the pool region 110/outer perimeter 112, and therefore, a higher (more urgent) level alarm may be triggered, such as loud noises, lights and/or a call to law enforcement, emergency response services or to an operator at an alarm monitoring agency. A pre-alarm may be used to issue a warning with a cancel mechanism before the full alarm is generated. In some embodiments, the higher level alarm may trigger a video stream from the sensor 20 that is sent to an operator at an alarm monitoring agency. FIG. 6 illustrates that the object 120 has "disappeared" in the pool region 110 and is no longer detectable by thermal/infrared sensors, very likely due to being submerged. In other words, if an object 120 enters the pool region 110 and is submerged, the object 120 will not generate a differing infrared signal because the object is submerged. Therefore, if an object 120 is viewable entering the pool region 110 and its infrared signal suddenly disappears or is reduced by a predefined level (for example, reduced by 50%, 60%, 70%, 80%, 90%, 95% or more of its previous contrasting signal), higher levels of alarms may be triggered because the object 120 is likely fully submerged.

Figure 7:
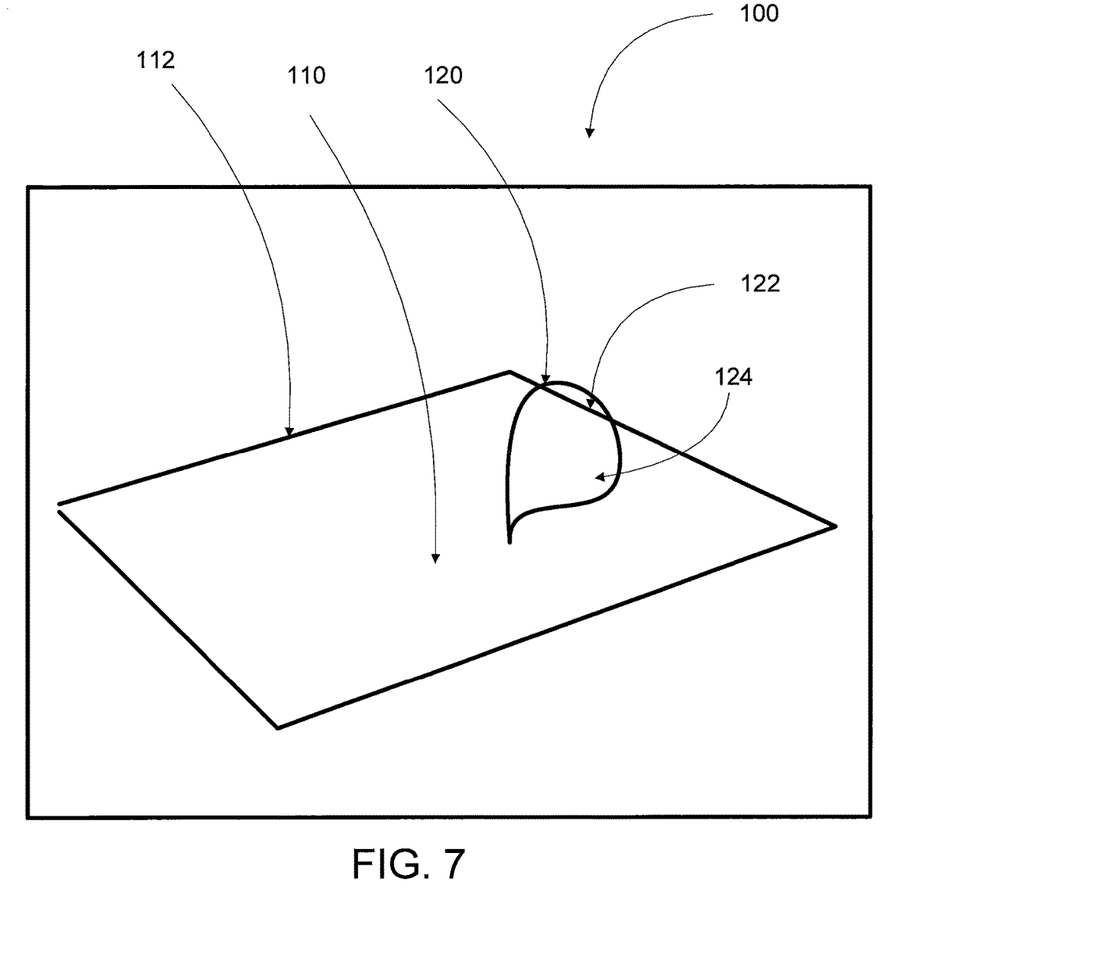
Figure 8:
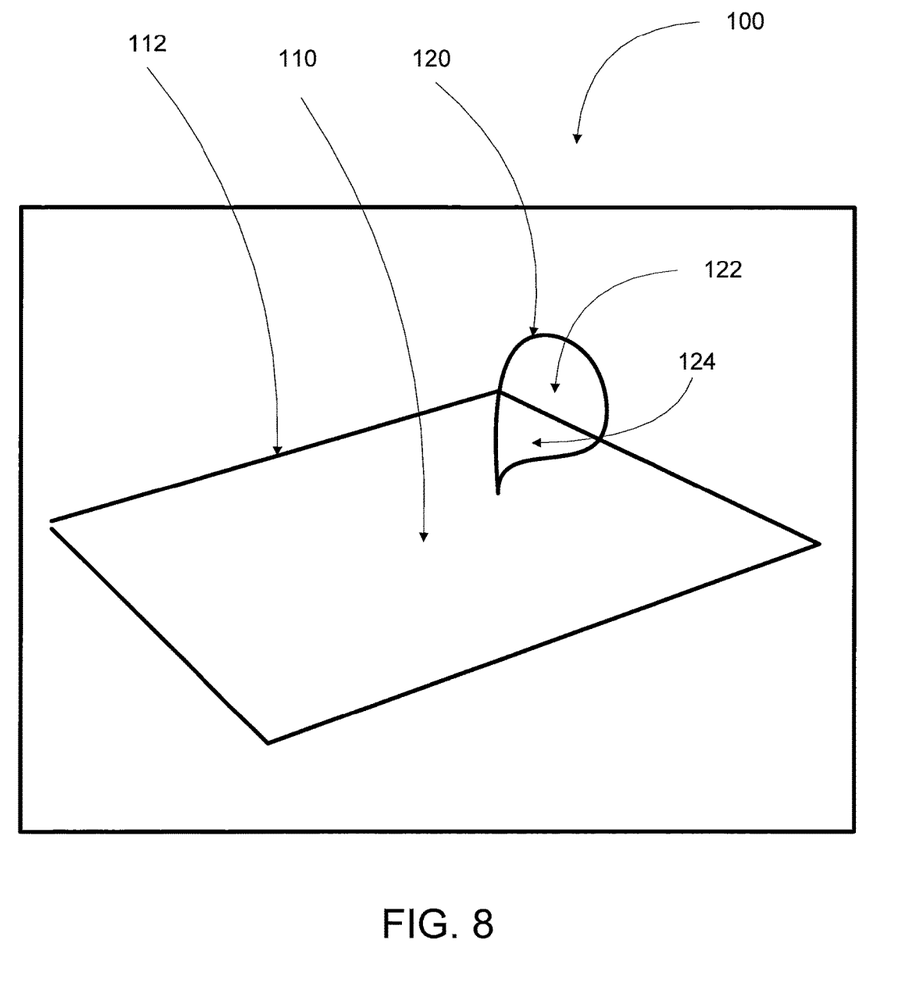

It should be understood that various parameters may be used to classify events and trigger actions/alarms. For example, the size of the object 120 may determine whether it is sufficiently large to be a person (even a small child) to trigger a drowning alarm. Characteristic shapes and/or heat signatures may also be used to determine whether the object 120 is a person. Moreover, an alarm can be triggered if a sufficient portion of the object is in the pool region 110. As shown in FIG. 7, the object 120 includes a region 122 that is above or outside of the perimeter 112 and a region 124 that is below the perimeter 112. If the height of the region 122 above the perimeter 112 is less than a threshold amount, such as a few inches, or inside the perimeter 112, then the alarm may be similar to that of an object 120 that is entirely submerged. If the height of the region 122 above the perimeter 112 is larger than the threshold amount, such as a few feet above the perimeter 112 (see FIG. 8), then a lower level of alarm or no alarm at all may be used.

Figure 9:
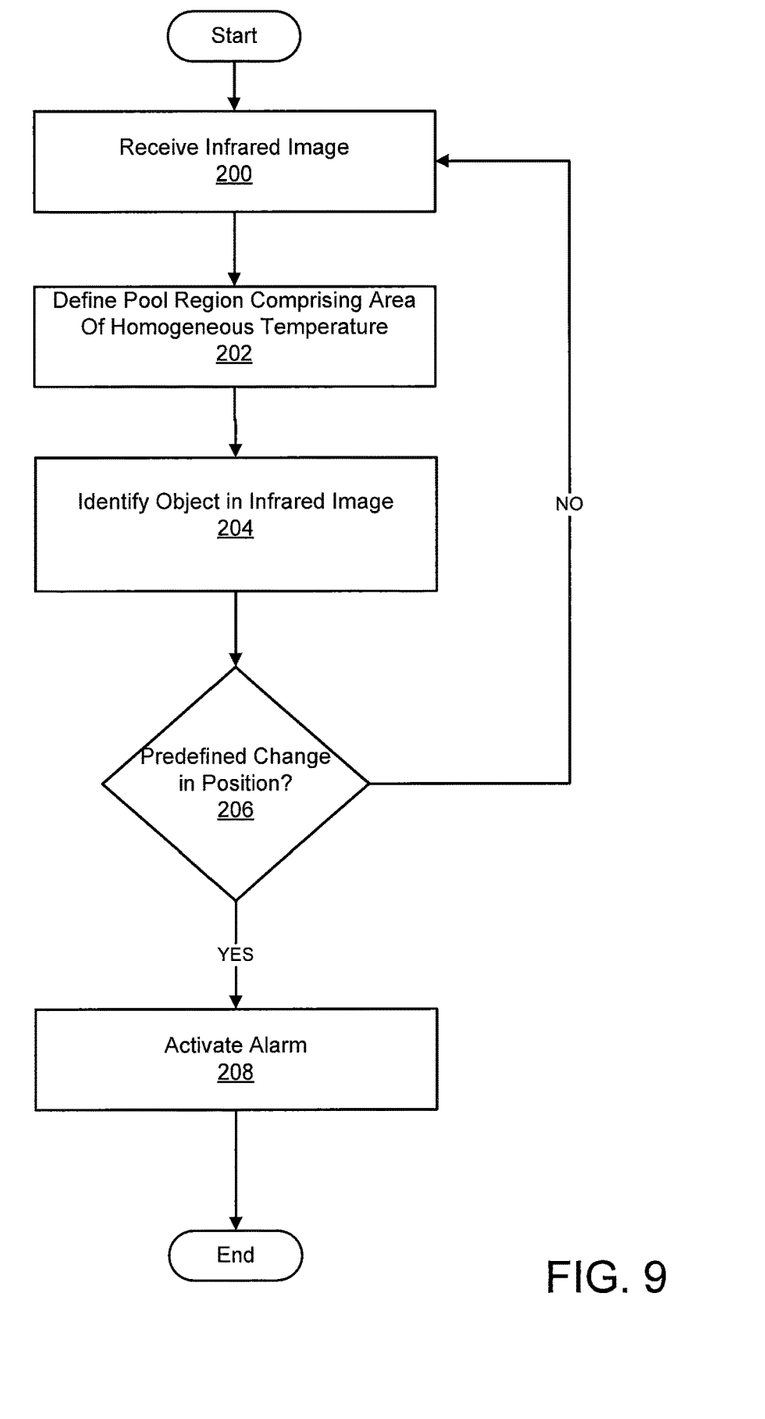
FIG. 9 is a flowchart illustrating operations according to some embodiments of the present invention.

As illustrated in FIG. 9, methods for detecting a presence of an object in an image comprising a pool region include receiving an infrared image are shown, including: receiving an infrared image (Block 200), identifying an area of substantially homogeneous temperature and having an outer perimeter, and defining a pool region in the infrared image comprising the area of substantially homogeneous temperature and having an outer perimeter (Block 202); identifying an object in the infrared image (Block 204); and if the object has a predefined change in position (Block 206), triggering an alarm (Block 208). For example, the predefined change in position can include detecting if the object extends into the pool region or if the object is in the pool region in a first image and then is absent from the pool in a second, subsequent image for longer than a predefined amount of time, which can indicate that the object is under water. Stated otherwise, a person who is submerged in the water is unlikely to change the thermal image in the infrared image of the water such that a submerged person is not visible. In some embodiments, the thermal infrared image may be combined with an image in the visible spectrum to determine that the person is in the water (as indicated in the visible spectrum image), but submerged in the water (as indicated by the absence of the person or a reduction in the signal associated with the person in the infrared image).

Although some embodiments are described herein with respect to infrared images, it should be understood that other imaging techniques may be used. For example, in a visual image, the pool region 110 may be defined by a flat region (or the largest planar region in the image).

In some embodiments, an infrared image may be compared with a visual image to track and monitor swimmers who are allowed to be swimming in the pool region 110. Swimmers may be tracked by both the infrared and visual spectrum images simultaneously. If the image sensor identifies an object moving in the water and then is unable to track or identify the object both in the infrared and visual images, a low level alert will occur, such as needing to do a buddy check because someone is lost. However, if the object is lost in the infrared image but is still seen in the visible light spectrum image, then the swimmer is very likely underwater, and a timer may be initiated to count how long they are underwater. If the swimmer is underwater longer than a defined period of time (between 5 and 90 second), a higher level of alarm (drowning alarm protocol) may be triggered. In some embodiments, "above" the water is only defined as when the swimmer is greater than between 1 to greater than 6 inches above the surface. This can be determined by measuring the angle of the highest point of the object above the water surface versus the water level or how high the object is in the image.

In some embodiments, the predefined period of time may be selected based on a particular swimmer and their swimming proficiency. For example, images of two or more swimmers may be received by the image analyzer 40 such as upon entry to the pool or stored from prior use, and visual spectrum images of the pool region may be analyzed by the image analyzer 40 and compared with the infrared images to determine which of the swimmers is represented by a particular object in the infrared image. The predefined period of time when the swimmer is likely to be under water because they are present and in the pool in the visual image, but absent from the infrared image, is selected based on the identified swimmer and an associated swim level. Accordingly, a non-swimmer can be assigned a shorter period of time to be underwater than a proficient swimmer.

In some embodiments, two, three or four or more cameras may be used. Underwater cameras may also be used to track and monitor swimmers. Glare filters may be utilized both in the visual and infrared spectrum to optimize the images.

In some embodiments, when the system is "armed" such that an alarm will sound if a person enters the pool region 110, a visual or auditory notification may be given when an object enters the image 100 field of view.

Alarms described herein may be sent via a computer network to a user device (cell phone, computer, etc.) or to other systems, such as a local emergency response system, first responders or other emergency systems.

Additional calibration or settings may be used, for example, to track the size shape and approximate thermal signature of known non-human objects, such as a pet, pool jet stream of water, spheres, hard edged object and the like, that will be allowed in the image without triggering the alarm.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for detecting a presence of an object in an image comprising a pool region, the method comprising:
   receiving an infrared image from an image sensor;
   identifying an area of substantially homogeneous temperature and having an outer perimeter;
   defining the pool region in the infrared image in response to the identified area of substantially homogeneous temperature and having an outer perimeter;
   identifying an object in the infrared image; and
   triggering an alarm in response to a predefined change in position of the object with respect to the pool region.

2. The method of claim 1, wherein identifying an object comprises detecting a person in the infrared image based on a temperature gradient of the object of at least four degrees Fahrenheit within the object.

3. The method of claim 1, wherein the predefined change in position of the object comprises detecting if the object extends into the pool region in the infrared image.

4. The method of claim 1, wherein the predefined change in position of the object comprises detecting the object in the pool region in a first infrared image and then detecting an absence or signal reduction associated with the object in a second, subsequent infrared image for longer than a predefined amount of time.

5. The method of claim 4, further comprising:
   receiving first and second visual images corresponding in time to the first and second infrared images, respectively, from another image sensor;
   wherein the alarm is triggered if the second visual image indicates that the object is in the pool region and the second infrared image indicates an absence or signal reduction associated with the object for longer than a predefined amount of time.

6. The method of claim 5, further comprising:
   receiving images of at least first and second users, wherein the predefined amount of time comprises a first predefined amount of time associated with the first user and a second predefined amount of time associated with the second user;
   identifying an image of the first or second user, wherein the object comprises the identified first or second user; and
   selecting the first or second predefined amount of time based on the identified first or second user.

7. The method of claim 1, further comprising triggering a notice if the image sensor can no longer sense the outer perimeter of the pool region for longer than a predefined amount of time.

8. The method of claim 1, further comprising triggering an alarm if the infrared image ceases to be received from the image sensor.

9. The method of claim 1, wherein the infrared image is a series of infrared images, and if a moving object is detected within a predefined region in or adjacent the pool region and then is absent from a subsequent infrared image in the series of infrared images for a predefined time, triggering an alarm.

10. The method of claim 1, wherein triggering an alarm comprises providing a pre-warning alarm before a full alarm is triggered, and accepting an abort command from a user during the pre-warning alarm that aborts the full alarm.

11. The method of claim 1, wherein when the alarm is triggered, a visual or audible alarm is emitted from an alarm unit.

12. A system for detecting a presence of an object in an image comprising a pool region, the system comprising:
   one or more image sensors that are configured to generate infrared images;
   an image analyzer configured to identify an area of substantially homogeneous temperature and having an outer perimeter, to define the pool region in the infrared images in response to the identified area of substantially homogeneous temperature and having an outer perimeter; to identify an object in the infrared image, and to trigger an alarm in response to a predefined change in position of the object with respect to the pool region.

13. The system of claim 12, wherein the image analyzer is configured to identify the object by detecting a person in the infrared image based on a temperature gradient of the object of at least four degrees Fahrenheit within the object.

14. The system of claim 12, wherein the predefined change in position of the object comprises detecting, by the image analyzer, if the object extends into the pool region in the infrared image.

15. The system of claim 12, wherein the predefined change in position of the object comprises detecting, by the image analyzer, the object in the pool region in a first infrared image and then detecting, by the image analyzer, an absence or signal reduction associated with the the object in a second, subsequent infrared image for longer than a predefined amount of time.

16. The system of claim 15, wherein the image analyzer is configured to receive first and second visual images corresponding in time to the first and second infrared images, respectively, from another image sensor; and to trigger the alarm if the second visual image indicates that the object is in the pool region and the second infrared image indicates an absence or signal reduction associated with the object for longer than a predefined amount of time.

17. The system of claim 16, wherein the image analyzer is configured to receive images of at least first and second users, wherein the predefined amount of time comprises a first predefined amount of time associated with the first user and a second predefined amount of time associated with the second user, the image analyzer is further configured to identify an image of the first or second user, wherein the object comprises the identified first or second user; and to select the first or second predefined amount of time based on the identified first or second user.

18. The system of claim 12, wherein the image analyzer is configured to trigger a notice if the image sensor can no longer sense the outer perimeter of the pool region for longer than a predefined amount of time.

19. The system of claim 12, wherein the image analyzer is configured to trigger an alarm if the infrared image ceases to be received from the image sensor.

20. The system of claim 12, wherein the infrared image is a series of infrared images, and the image analyzer is configured to trigger an alarm if a moving object greater than a predefined size is detected within a predetermined region in or adjacent the pool region and then is absent from a subsequent infrared image in the series of infrared images.

21. The system of claim 12, the image analyzer is configured to trigger an alarm that provides a pre-warning alarm before a full alarm is triggered, and the image analyzer is configured to accept an abort command from a user during the pre-warning alarm that aborts the full alarm.

22. The system of claim 12, further comprising an alarm unit configured to receive the trigger for an alarm from the signal analyzer such that when the alarm is triggered, a visual or audible alarm is emitted from an alarm unit.

* * * * *